(12) United States Patent
Chin et al.

(10) Patent No.: US 7,961,882 B2
(45) Date of Patent: Jun. 14, 2011

(54) METHODS AND APPARATUS FOR INITIALIZATION VECTOR PRESSING

(75) Inventors: David Chin, Los Altos, CA (US); Mark Buer, Gilbert, AZ (US); Roger Luo, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 468 days.

(21) Appl. No.: 11/902,667

(22) Filed: Sep. 24, 2007

(65) Prior Publication Data

US 2008/0260158 A1 Oct. 23, 2008

Related U.S. Application Data

(63) Continuation of application No. 10/378,035, filed on Feb. 27, 2003, now Pat. No. 7,274,792.

(60) Provisional application No. 60/403,030, filed on Aug. 9, 2002.

(51) Int. Cl.
*H04L 9/12* (2006.01)

(52) U.S. Cl. .......................................... 380/262; 380/37

(58) Field of Classification Search .................. 380/262
See application file for complete search history.

(56) References Cited

U.S. PATENT DOCUMENTS

| | | | |
|---|---|---|---|
| 4,850,017 A | 7/1989 | Matyas et al. |
| 4,918,728 A | 4/1990 | Matyas et al. |
| 4,924,514 A | 5/1990 | Matyas et al. |
| 4,924,515 A | 5/1990 | Matyas et al. |
| 4,941,176 A | 7/1990 | Matyas et al. |
| 4,993,069 A | 2/1991 | Matyas et al. |
| 5,007,089 A | 4/1991 | Matyas et al. |
| 5,073,934 A | 12/1991 | Matyas et al. |
| 5,103,478 A | 4/1992 | Matyas et al. |
| 5,142,578 A | 8/1992 | Matyas et al. |
| 5,164,988 A | 11/1992 | Matyas et al. |
| 5,177,791 A | 1/1993 | Yeh et al. |
| 5,200,999 A | 4/1993 | Matyas et al. |
| 5,201,000 A | 4/1993 | Matyas et al. |
| 5,214,698 A | 5/1993 | Smith, Sr. et al. |
| 5,231,666 A | 7/1993 | Matyas et al. |
| 5,265,164 A | 11/1993 | Matyas et al. |
| 5,301,231 A | 4/1994 | Abraham et al. |
| 5,319,705 A | 6/1994 | Halter et al. |

(Continued)

OTHER PUBLICATIONS

Deepakumara et al, "FPGA Implementation of MD5 Hash Algorithm", Electrical and Computer Engineering, 2001, pp. 919-924.

Menezes, OOrschot, Vanstone; "Handbook of Applied Cryptography, Passage", CRC Press Series on Discrete Mathematics and Its Applications, CRC Press, 1997, pp. 228-232 and 364-368.

Scheier, B, "Applied Cryptography: Protocols, Algorithms, and Source Code in C, Passage", John Wiley & Sons, 1996, pp. 193-196 and 200-205.

European Search Report, European Application No. EP 03 01 8262.

*Primary Examiner* — Matthew B Smithers
(74) *Attorney, Agent, or Firm* — Sterne Kessler Goldstein & Fox, P.L.L.C.

(57) ABSTRACT

Methods and apparatus are provided for using explicit initialization vectors in both encryption and decryption processing. In one example, a sender generates an initialization vector, identifies cryptographic keys, encrypts data using the initialization vectors and the cryptographic keys, and transmits the encrypted data in a packet along with the initialization vector. A receiver identifies cryptographic keys, extracts the initialization vector from the received packet, and decrypts the encrypted data using the cryptographic keys and the initialization vector extracted from the received packet.

17 Claims, 8 Drawing Sheets

U.S. PATENT DOCUMENTS

| | | |
|---|---|---|
| 5,323,464 A | 6/1994 | Elander et al. |
| 5,432,849 A | 7/1995 | Johnson et al. |
| 5,870,470 A | 2/1999 | Johnson et al. |
| 5,987,124 A | 11/1999 | Matyas et al. |
| 6,055,316 A * | 4/2000 | Perlman et al. ............... 380/262 |
| 6,477,646 B1 | 11/2002 | Krishna et al. |
| 6,963,979 B2 | 11/2005 | Fairclough et al. |
| 7,082,534 B2 * | 7/2006 | Tardo ............................. 713/161 |
| 7,274,792 B2 | 9/2007 | Chin et al. |
| 2002/0108048 A1 | 8/2002 | Qi et al. |

* cited by examiner

METHODS AND APPARATUS FOR INITIALIZATION VECTOR PRESSING

CROSS REFERENCE TO RELATED APPLICATIONS

This application is a continuation of U.S. application Ser. No. 10/378,035, entitled "Methods and Apparatus for Initialization Vector Processing," filed Feb. 27, 2003 now U.S. Pat. No. 7,274,792 which claims priority under U.S.C. 119(e) from U.S. Provisional Application No. 60/403,030, entitled Methods and Apparatus for Encryption and Decryption Using Explicit IV, at the time of filing on Aug. 9, 2002, by David Chin, Mark Buer, and Roger Luo, the disclosures of each are incorporated by reference for all purposes in their entireties.

BACKGROUND OF THE INVENTION

1. Field of the Invention

The present invention relates to implementing a cryptography engine. More specifically, the present invention relates to methods and apparatus for processing initialization vectors or initial values.

2. Description of Related Art

Conventional software and hardware designs for implementing various cryptography engines often process initialization vectors inefficiently. Initialization vectors or initial values (IVs) are used in a variety of different cryptographic algorithms and are described in Applied Cryptography, Bruce Schneier, John Wiley & Sons, Inc. (ISBN 0471128457), incorporated by reference in its entirety for all purposes.

In typical implementations, initialization vectors or initial values are used to randomize the encryption of data sequences. In one example, when two data blocks are encrypted using a block cipher, the two encrypted data blocks for a given data block are the same. Having the same encrypted data blocks result from the encryption may provide useful information to an eavesdropper. Initialization vectors make the encrypted data blocks different, even if the two data blocks are the same. In many implementations, the initialization vector is passed with the encrypted data block to allow the retrieval of the original data block after decryption.

However, processing of the initialization vector at the entity encrypting the data and at the entity decrypting the data is inefficient. It is therefore desirable to provide methods and apparatus for improving the handling of initialization vectors.

SUMMARY OF THE INVENTION

Methods and apparatus are provided for using explicit initialization vectors in both encryption and decryption processing. In one example, a sender generates an initialization vector, identifies cryptographic keys, encrypts data using the initialization vectors and the cryptographic keys, and transmits the encrypted data in a packet along with the initialization vector. A receiver identifies cryptographic keys, extracts the initialization vector from the received packet, and decrypts the encrypted data using the cryptographic keys and the initialization vector extracted from the received packet.

In one embodiment, a method for decrypting data is provided. Key information associated with a secure connection is maintained in a command context structure. A packet associated with the secure connection is received. The packet includes encrypted data and an initialization vector. The initialization vector is extracted from the packet. The initialization vector is passed to a decryption engine. Key information is provided from a command context structure associated with the secure connection to the decryption engine.

In another embodiment, a cryptography accelerator coupled to a host in a computer system is provided. The cryptography accelerator includes an interface and a decryption engine. The interface couples the cryptography accelerator to a host in a computer system. The interface is operable to receive a packet associated with a secure connection between the computer system and a network entity. The secure connection is associated with packet communication between the computer system and the network entity using a shared key. The interface is configured to receive a packet associated with the secure connection, the packet including encrypted data and an initialization vector. A decryption engine is configured to receive an initialization vector extracted from the packet associated with the secure connection and obtain key information from a command context structure.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

The present invention relates to implementing a cryptography accelerator. More specifically, the present invention relates to methods and apparatus for accelerating cryptographic processing such as IPsec (Internet Protocol Security), IKE (Internet Key Exchange), SSL (Secure Socket Layer), and TLS (Transport Layer Security) processing using explicit IV (Initialization Vectors, Initial Values).

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of improved techniques for using explicit IV with respect to DES (Data Encryption Standard), 3DES (Triple Data Encryption Standard), and AES (Advanced Encryption Standard) processing. However, it should be noted that the techniques of the present invention can be applied to a variety of different cryptography processing engines as well as processing engines in general. In particular, the techniques of the present invention are applicable to block ciphers. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
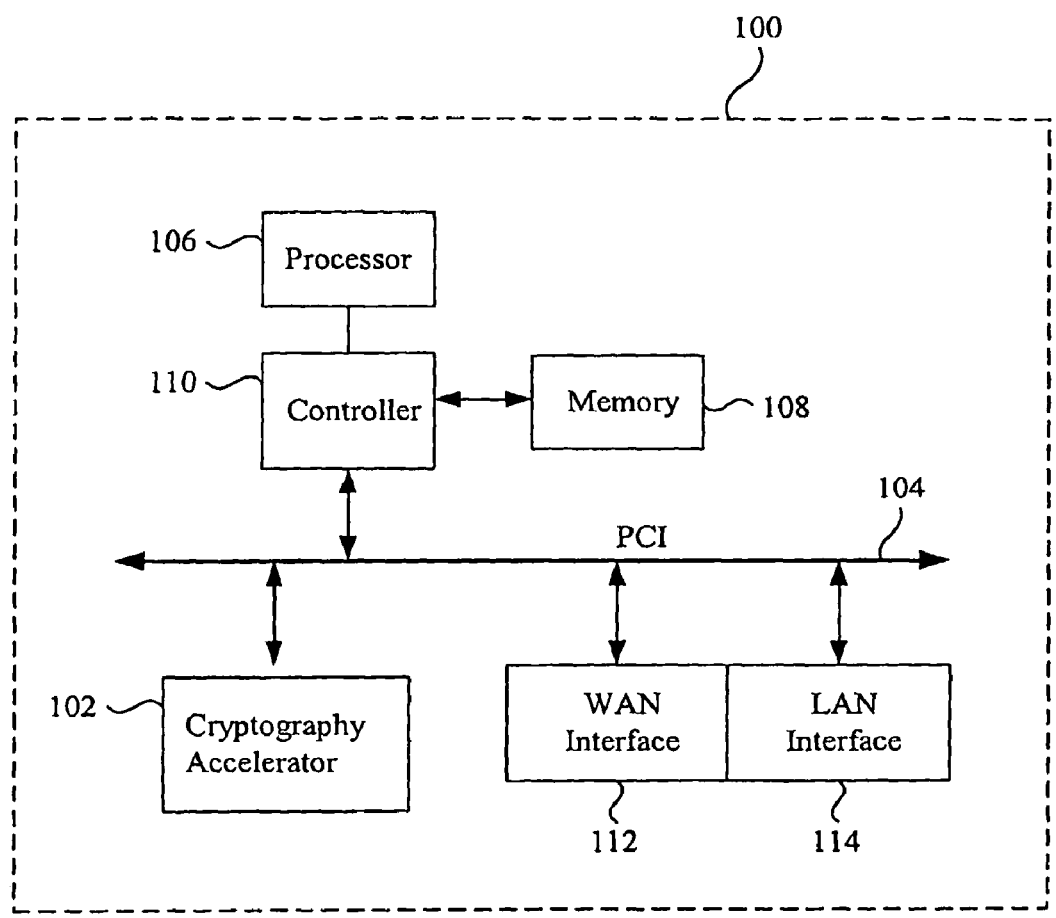
FIG. 1 is a diagrammatic representation of a system that can use the techniques of the present invention.

FIG. 1 is a diagrammatic representation of one example of a processing system 100 in accordance with an embodiment of the present invention. As shown in FIG. 1, the present invention may be implemented in a stand-alone cryptography accelerator 102 or as part of the system 100. In the described embodiment, the cryptography accelerator 102 is connected to a bus 104 such as a PCI bus via a standard on-chip PCI interface. The processing system 100 includes a processing unit 106 and a system memory unit 108. The processing unit 106 and the system memory unit 108 are coupled to the system bus 104 via a bridge and memory controller 110. Although the processing unit 106 may be the central processing unit (CPU) of a system 100, it does not necessarily have to be the CPU. It can be one of a variety of processors in a multiprocessor system. In one example, a LAN interface 114 is provided to couple the processing system 100 to a local area network (LAN) to allow packet receipt and transmission. Similarly, a Wide Area Network (WAN) interface 112 can also be provided to connect the processing system to a WAN (not shown) such as the Internet. The WAN interface manages in-bound and out-bound packets, providing automatic authentication processing for IP packets.

According to various embodiments, the cryptography accelerator 102 is an application specific integrated circuit (ASIC) coupled to the processor 106. The cryptography accelerator 102 can also be a programmable logic device (PLD), field programmable gate array (FPGA), or other device coupled to the processor 106. According to specific embodiments, the cryptography accelerator 102 is implemented either on a card connected to the bus 104 or as a standalone chip integrated in the system 100.

In other embodiments, the cryptography accelerator 102 itself is integrated into the processing core of a CPU of system 100, such as that available from Tensilica Corporation of Santa Clara, Calif. or ARC Cores of San Jose, Calif. In another embodiment, techniques and mechanisms of the present invention are integrated into a CPU such as a CPU available from Intel Corporation of San Jose, Calif. or AMD Corporation of Sunnyvale, Calif. By implementing cryptography accelerator functionality entirely on the processor 106, a separate card or chip in the system 100 is not needed. In still other embodiments, the processing system 100 including the cryptography accelerator 102 is implemented as a system on a chip (SOC). The network interfaces, memory, processing core, and cryptography accelerator functionality are provided on a single integrated circuit device.

Figure 2:
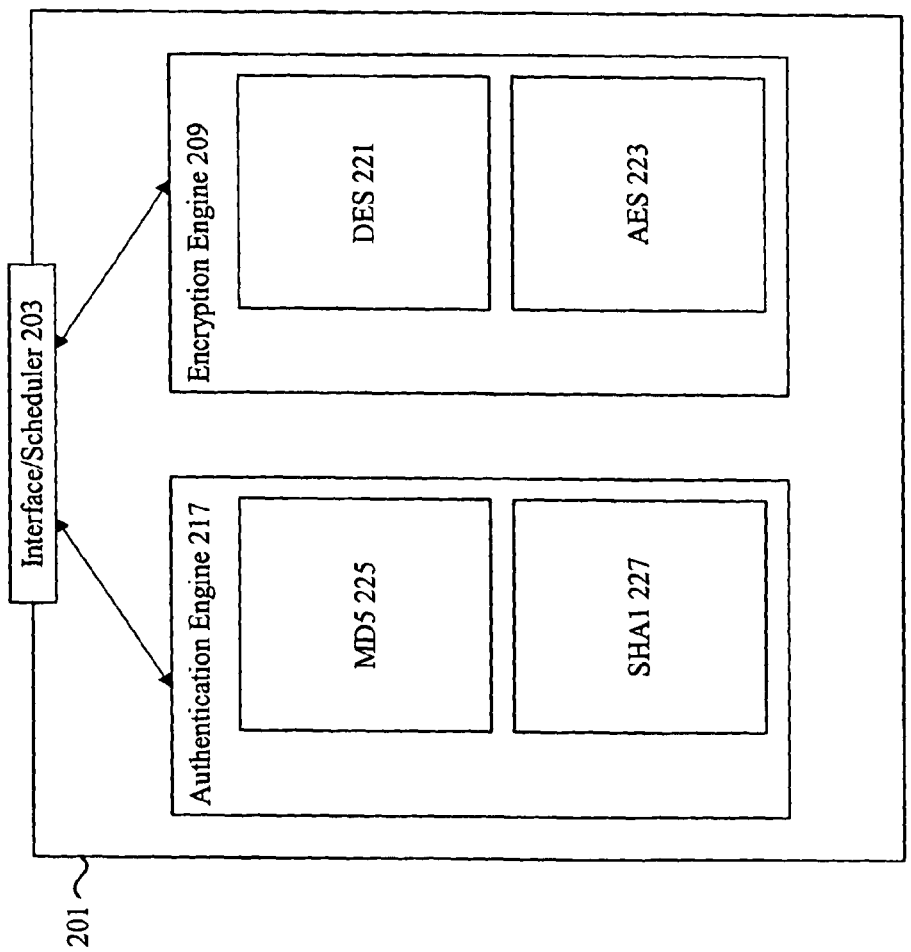
FIG. 2 is a diagrammatic representation of a cryptography engine having an authentication engine and an encryption engine.

FIG. 2 is a diagrammatic representation of one example of a cryptography accelerator 201. The cryptography accelerator 201 includes an interface 203 connected to a host such as an external processor. The interface 203 can receive information from the host for processing and send information to the host when processing is completed. In one example, the interface 203 includes a controller and context buffers. The controller derives information from data received from the host and provides the information along with context such as algorithm information, initialization values, and keys to the various encryption and authentication engines. Cryptography engine 209 can include DES engine 221 and AES engine 223. It should be noted that a cryptography accelerator 201 can include other components as well, such as a public key engine. 3DES is described in Applied Cryptography, Bruce Schneier (ISBN 0471128457), the entirety of which is incorporated by reference for all purposes.

In typical implementations, a secured connection typically includes a handshake phase and a data transfer phase. Any connection between two entities exchanging encrypted data using the same key or set of keys is referred to herein as a secure connection or a secured connection. In one example, a secure connection is an IPsec secure session. During a handshake phase, network entities are authenticated and cryptographic keys are exchanged. Data transfer typically occurs after the handshake phase is completed and command information is established for the secure connection. A particular secure connection or connection may be identified by address and connection information. According to various embodiments, command information includes cryptographic keys, state information, and addresses used to allow the exchange of information between two entities. After a secure connection is established, a first entity can transmit packets to a second entity using the secure connection and the security association. Both entities will then have the keys needed to encrypt and decrypt the data.

However, in many cryptographic algorithms such as DES, 3DES, AES, and block ciphers in general, information is encrypted and decrypted using not only keys, but also initialization vectors or initialization values. Many encryption algorithms, in particular block cipher algorithms, will encrypt the same plain text into the same ciphertext. In one example, two messages that begin with the same text will both be encrypted the same way up to the first difference. Many messages may have the same header or title. The identical beginning might provide a cryptanalyst with information that could jeopardize the security of the underlying cryptographic algorithms. Consequently, many cryptographic algorithms are encrypted and decrypted by not only using keys, but also by using a random sequence or relatively random sequence such as an initialization vector.

While the initialization vector itself typically has no meaning, the initialization vector is provided to make the transmitted message unique. The same message encrypted using two different initialization vectors would yield different ciphertext. That is, even if multiple packets in a secure connection are the same, the different initialization vectors transmitted with each of the multiple packets would allow representation of the identical packets with different ciphertext. When a receiver decrypts the data, the initialization vector is used to derive the plaintext. While cryptographic keys remain the same for a particular connection, initialization vectors vary, typically for each packet transmitted in a secure connection. However, it is possible to use the same initialization vector for all of the messages in a session.

The initialization vector does not need to be secret or known only to the sender and receiver. In fact, it can be transmitted as plaintext with the associated ciphertext. In some examples, initialization vectors can be used with cipher block chaining. Cipher block chaining uses initialization vectors to help reduce the predictability of many encryption techniques.

Cipher block chaining adds feedback to a block cipher. That is, the information related to the encryption of a first block is fed back into the encryption of a second block. An initialization vector is used as the feedback for the encryption of the first block. Information related to the decryption of a first block is input into the decryption of a second block. The same initialization vector can be used as the feedback for the decryption of the first block. Each encrypted or decrypted block is dependent not just on the data block that generated it but also on all previous data blocks along with any initialization vectors. In cipher block chaining, data is combined typically using an XOR function with the previous encrypted block before the data is decrypted.

Figure 3:
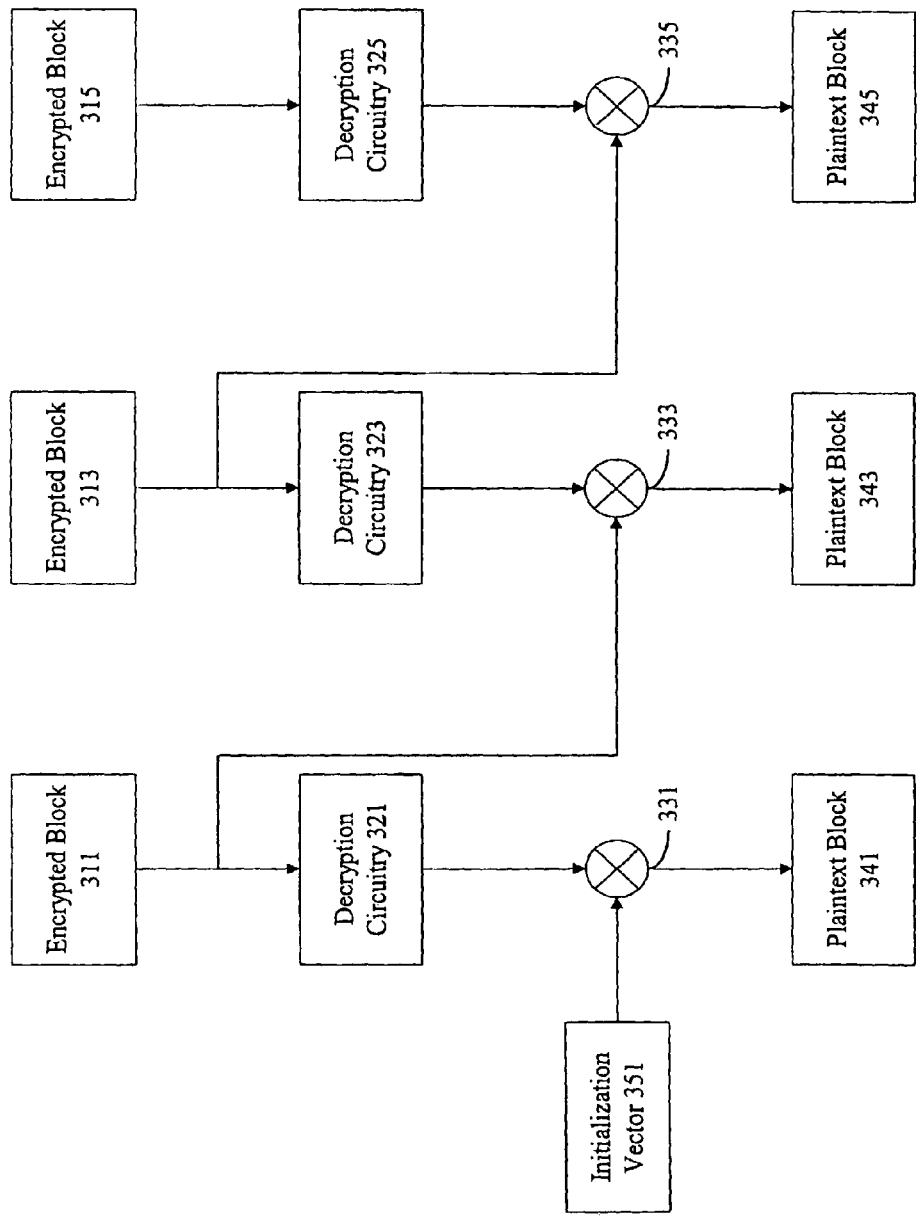
FIG. 3 is a diagrammatic representation showing cipher block chaining.

FIG. 3 is a diagrammatic representation showing one example of cipher block chaining that uses an initialization vector. Although the technique of FIG. 3 is described in the context of decryption, it should be noted that the same technique can be applied to encryption of plaintext blocks in the same manner. Furthermore, although the techniques will be described in the context of cipher block chaining, it should be noted that the techniques of the present invention can be used in other contexts as well, such as cipher-feedback mode.

According to various embodiments, encrypted block 311 is passed to decryption circuitry 321. The output of decryption circuitry 321 is XORed with an initialization vector 351 to produce a plain text block 341. In some embodiments, the initialization vector is a sequence of random or pseudo random data shared by an entity encrypting the data and the entity decrypting the data. In one example, a client encrypting the data using cipher block chaining uses a randomly generated initialization vector. Any mechanism for generating initialization vectors is referred to herein as an initialization vector generator. In one example, the interface shown in FIG. 2 generates a initialization vector by using time stamp information as the initialization vector. In another example, the client uses a time stamp. The client then sends the initialization vector along with the encrypted data to a receiver. The receiver then decrypts the data using cipher block chaining and the transmitted initialization vector. By using initialization vectors, identical plain text messages encrypt to different cipher text messages.

According to various embodiments, the encrypted block 311 is also passed to XOR component 333. Encrypted block 313 is decrypted using decryption circuitry 323 and combined with the encrypted block 311 at XOR component 333. The results of the XOR combination is plain text block 343. Encrypted block 313 is also passed to XOR component 335. Encrypted block 315 is passed to decryption circuitry 325. The output of decryption circuitry 325 is XORed with encrypted block 313 to produce plain text block 345.

In typical implementations, command information is maintained for a plurality of packets transmitted between two entities. A mechanism for maintaining the command information is referred to herein as a command context structure. In one example, a first entity sending a packet to a second entity first generates an initialization vector associated with the packet. Typically, the initialization vector is a random or pseudo random sequence. The initialization vector along with keys used to encrypt the data for transmission to the second entity are maintained in the command context structure. By maintaining the command context structure, all the information associated with encrypting or decrypting the packet is stored in a convenient location. When a second entity receives the encrypted packet, the second entity extracts the initialization vector and copies the initialization vector into a command context structure. It should be noted that typically the initialization vector is not encrypted but authenticated in a transmitted packet. Cryptographic keys used for encryption and decryption are not included in typical packet transmission. Cryptographic keys are typically part of a command context, connection states, or a security association.

Figure 4:
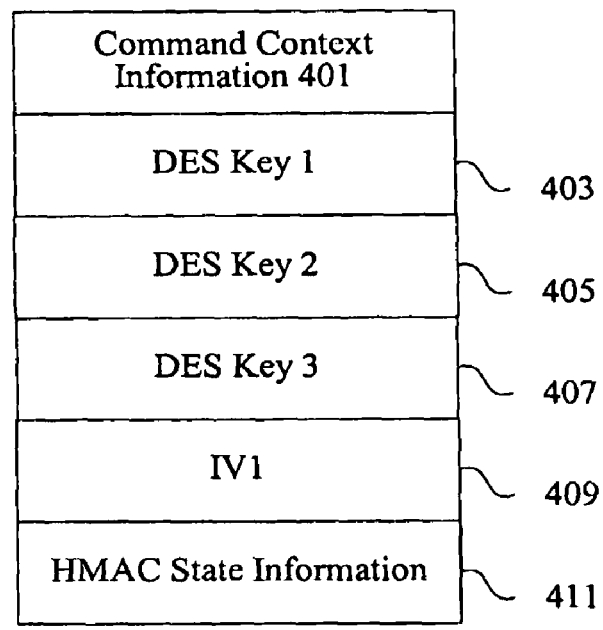
FIG. 4 is a diagrammatic representation depicting DES command context information.
Figure 4:
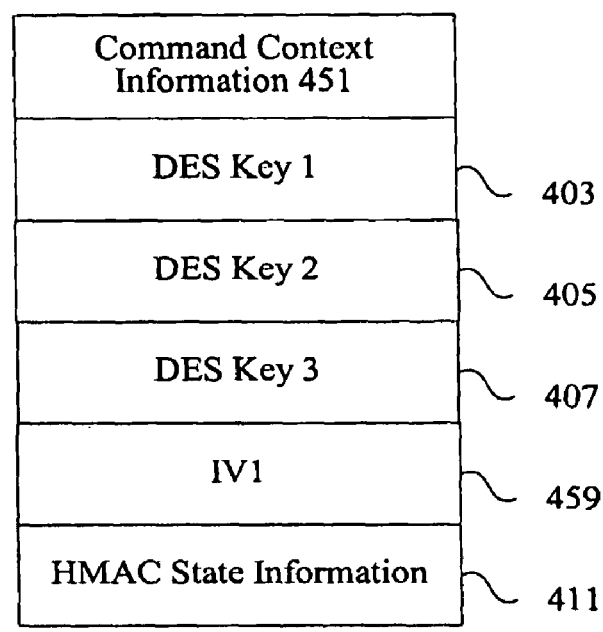

FIG. 4 is a diagrammatic representation of a command context structure. A command information context structure 401 typically includes key information such as DES keys 403, 405, and 407. In some examples, three DES keys are provided even when 3DES is not used. The command information context structure 401 also typically includes an initialization vector 409 for encrypting or decrypting a particular data block or data sequence. HMAC state information 411 may include HMAC inner state and HMAC outer state information used for authentication using mechanisms such as SHA1-HMAC or MD5-HMAC. In one example, the second entity copies the initialization vector into a command context structure 401. The command context structure 401 is then used to decrypt received data. That is, the keys and the initialization vector 411 in the structure are copied for decryption processing on the transmitted packet.

In this example, when a second data block is received, the receiver copies the new initialization vector into a command context structure 401. The command information context structure 451 now includes a new initialization vector 461 associated with the new packet. According to various embodiments, the new data is a second block of data associated with the same session as the first received block of data. However, a new initialization vector is provided to decrease predictability of the underlying cryptography algorithms. The command context structure 451 is then used to decrypt the received data. That is, the keys and the initialization vector 461 in the structure are copied for decryption processing on the transmitted packet. Although updating and copying initialization vectors into a command context structure provides a convenient technique for encrypting and decrypted packets, the techniques of the present invention recognize that maintaining multiple structures and repeatedly updating and copying data to and from the command information context structures decreases efficiency in encryption and decryption processing. Copying data to and from the command information context structures significantly impacts the performance of a host CPU that typically has to acquire command context information from memory. However, the techniques of the present invention provide a single command context structure likely held in CPU cache.

It should be noted that although the command context structure is described above to include key and state information, other information may be included as well. For example, fields may be reserved for specifying the size of the context structure, the size of the keys, modes, flags, or direction. The direction may indicate whether the data is inbound or outbound. In one example, output data is encrypted then authenticated and inbound data is authenticated then decrypted. Some flags may indicate whether DES or 3DES is being used. Other flags may indicate the type of authentication needed or the size of an AES key.

Figure 5:
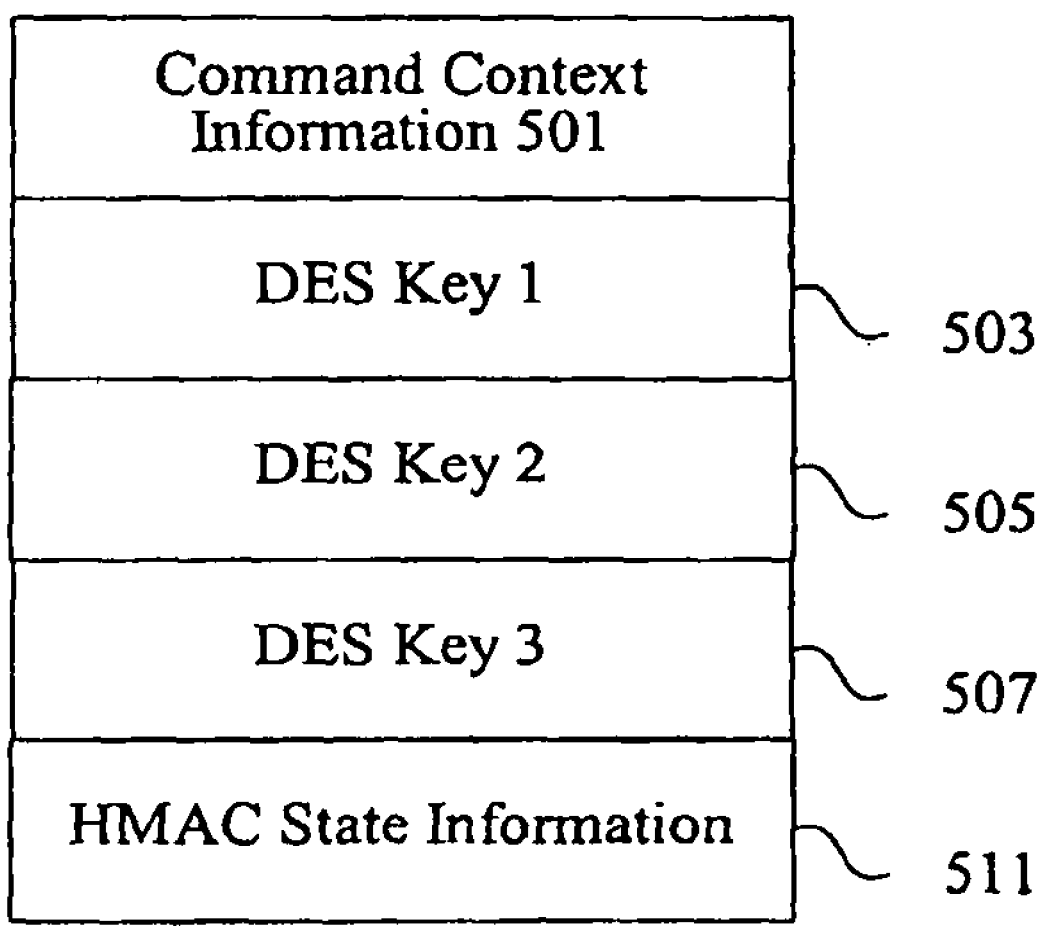
FIG. 5 is a diagrammatic representation showing command context information without a stored initialization vector.

According to various embodiments, the techniques of the present invention provided a command context structure with explicit IV. FIG. 5 is a diagrammatic representation of a command context structure with explicit IV. Any command context structure that does not include initialization vector information is referred to herein as a command context structure with explicit IV. The command context structure 501 includes key information 503, 505, and 507. The command context structure 501 also includes HMAC state information 509 along with other size, mode, flag, or direction information. It should be noted that the command context structure 501 with explicit TV does not include initialization vector information.

By using explicit initialization vectors, a single command context structure can be maintained for a given session. Instead of maintaining a command context structure for each of multiple packets in a given secure connection, a single structure is maintained for a given secure connection. For encryption of a data packet, an initialization vector is generated. The initialization vector is then passed to an encryption engine such as a DES engine along with one or more keys from the command context structure. The initialization vector is passed to the encryption engine without copying the initialization vector into a command context structure associated with the packet.

By maintaining key information but not initialization vector information in a command context structure with explicit IV, a single structure along with a single reference to the structure can be used for all packets in a secure connection. That is, different pointers or references to different structures with different initialization vectors but the same keys do not need to be passed to cryptographic processing engines. Instead, a single pointer or reference can be passed for all encryption or decryption. The processing engine can be configured to receive key information from a command context structure and receive initialization vector information from an IV generator.

When an encrypted packet is received, the initialization vector is extracted from the packet and passed directly to a decryption engine along with the keys from the command context structure associated with the secure connection. No initialization vector is copied into a command context structure. According to various embodiments, the initialization vector is explicitly extracted from a packet upon receipt of the packet. In some examples, the initialization vector is in a predetermined position in the packet. In other examples, the location is calculated.

Figure 6:
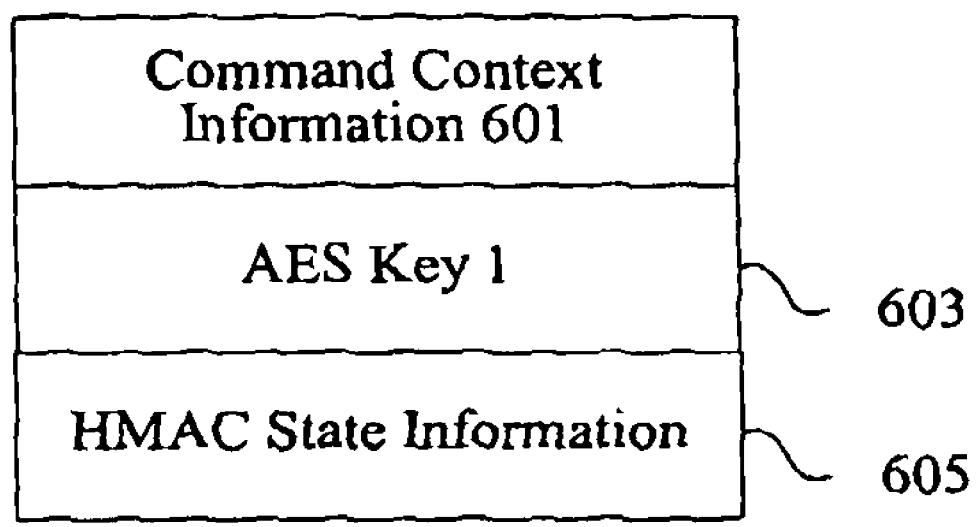
FIG. 6 is a diagrammatic representation showing AES command context information.

The techniques of the present invention can be applied to a variety of different algorithms including AES. FIG. 6 is a diagrammatic representation of a command context structure for AES. The command context structure 601 with explicit IV includes and AES key 603 and HMAC state information 605. In typical implementations, the cipher block size is 8 bytes for DES while the cipher block size is 16 bytes for AES.

The techniques of the present invention have been described with reference to blocks ciphers such as DES, 3DES, and AES. However, it should be noted that the techniques of the present invention can be applied to a variety of other blocks ciphers as well as stream ciphers and blocks ciphers used in cipher-feedback (CFB) mode, for instance. With cipher block chaining, encryption can typically not begin until a complete block of data is received. This may be a drawback in applications where data should be transmitted as soon as a host enters the data. In CFB mode, data can be encrypted in units smaller than a block size. In one example, data is encrypted on ASCII character at a time.

To initialize the CFB process, the input to the block algorithm is initialized with an initialization vector that need not be secret. Although the initialization vector need not be secret, the each initialization vector used is unique. It should be noted that in cipher block chaining mode, each initialization vector is preferably unique, but does not have to be. If the initialization vector is not unique, a cryptanalyst can more easily recover the associated plaintext. Because the initialization vector changes for every message, using a command context structure with explicit IV is beneficial in that the initialization vector in the context structure does not have to be changed for every message. Instead, each initialization vector can be extract directly from the received packet, or provided immediately before encrypted a packet for transmission.

Figure 7:
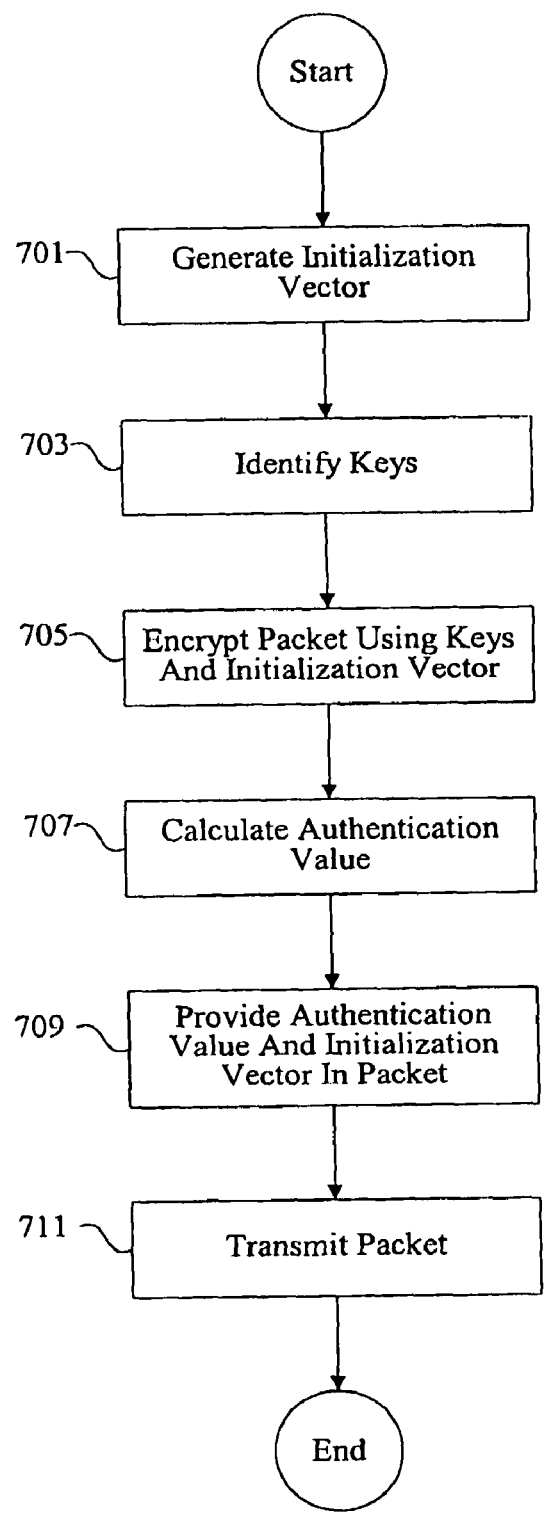
FIG. 7 is a process flow diagram showing a technique for providing an initialization vector.

FIG. 7 is a flow process diagram showing a technique for transmitting a packet encrypted using explicit IV. According to various embodiments, an initialization vector is generated for a particular packet at 701. In some examples, the initialization vector is a random sequence. In other examples, the initialization vector is a time stamp. The keys for the particular packet are then determined at 703. According to various embodiments, the keys are extracted from a command context structure associated with the session of the packet. The session can be determined based on information such as the source and destination addresses along with the source and destination port numbers of the packet. In typical implementations, the initialization vector is copied into the command context structure. However, copying the initialization vector into the command context structure can be an inefficient use of resources. The techniques of the present invention contemplate using the initialization vector without copying the value into the command context structure.

In one example, the data in the packet is encrypted at 705 using the keys from the command context structure and the dynamically generated initialization vector. In many cases, an interface between a host and a cryptography processing block passes a reference to the command context structure to a particular cryptography engine along with initialization vector information. Instead of passing different references to different command context structures that include different initialization vectors, a reference to the same command context structure can be provided. An authentication value can then be calculated at 707, typically using a hash function such as SHA1 or MD5. It should be noted that the authenticated value may or may not be encrypted and may cover varying amounts of data in the packet. The authentication value and the initialization vector are then provided in the packet at 709. In many implementations, the initialization vector can not be encrypted because the initialization vector is needed to decrypt the data. However, the authentication value can cover the data, the encrypted data, and/or the initialization vector or other fields. The packet can then be transmitted at 711.

By maintaining key information but not initialization vector information in a command context structure with explicit IV, a single structure along with a single reference to the structure can be used for all packets in a secure connection. That is, different pointers or references to different structures with different initialization vectors but the same keys do not need to be passed to cryptographic processing engines by the interface. Instead, a single pointer or reference can be passed for all encryption or decryption. The processing engine can be configured to receive key information from a command context structure and receive initialization vector information from an IV generator.

Figure 8:
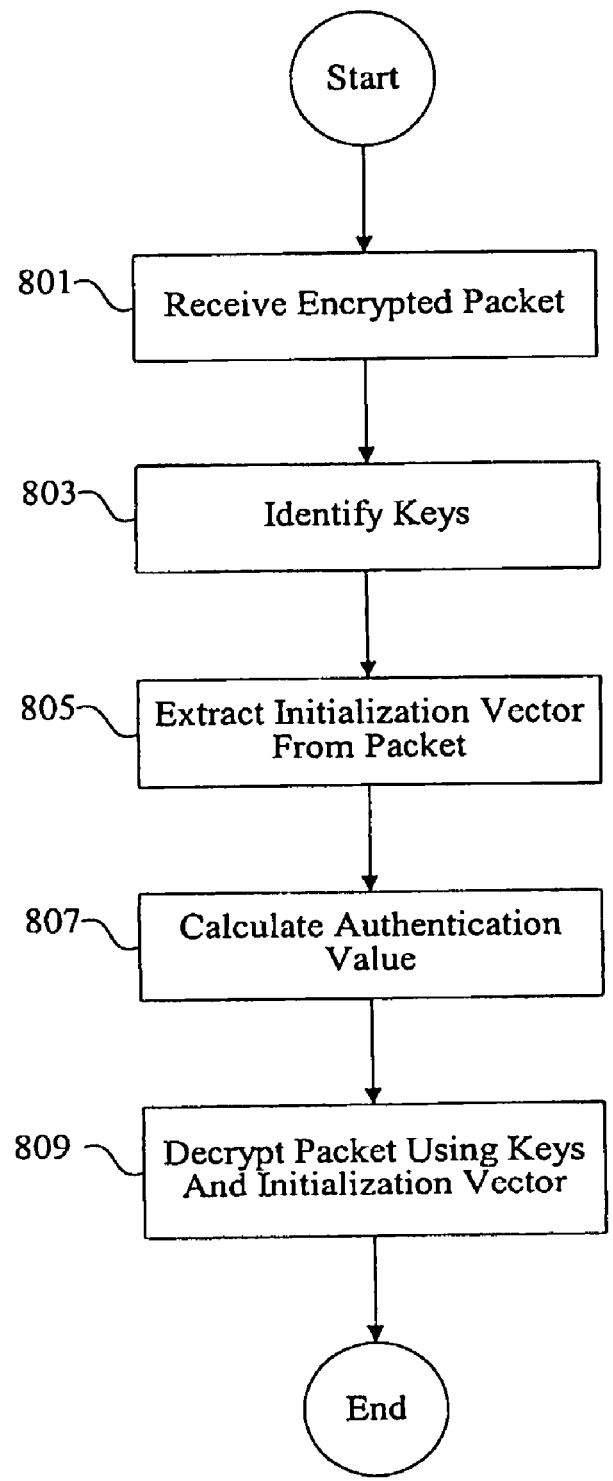
FIG. 8 is a process flow diagram showing a technique for acquiring an initialization vector.

FIG. 8 is a flow process diagram showing a technique for receiving a packet using explicit IV. An encrypted packet is received at 801. The keys are extracted from a command context structure identified by using information such as source and destination addresses and source and destination port numbers. The keys are provided at 803. The initialization vector is extracted from the packet and passed directly to a decryption engine at 805. No initialization vector is copied into a command context structure. According to various embodiments, the initialization vector is explicitly extracted from a packet upon receipt of the packet. In some examples, the initialization vector is in a predetermined position in the packet. In other examples, the location is calculated. An authentication value is then calculated using mechanisms such as MD5 or SHA1 at 807. The packet is then decrypted using keys and the initialization vector at 809.

It should be noted that the techniques of the present invention may be performed in a variety of different sequences and typically may be performed by an interface between the cryptography engines and a host. In one example, a controller in the interface acquires initialization vector information from a packet sent by a host and provides the initialization vector along with keys extracted from a command context structure to cryptography cores. The interface may be responsible for scheduling processing of the packet. For example, the interface may schedule the authentication value for a particular packet to be calculated before keys and an initialization vector are identified. Alternatively, the packet can be authenticated after the decryption using the keys and the initialization vector is completed.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of encryption algorithms and should not be restricted to the ones mentioned above. It is therefore intended that the invention be interpreted to include all variations and equivalents that fall within the true spirit and scope of the present invention.

What is claimed is:

1. A method, in a first device having a cryptographic processor, for performing cryptographic operations on data packets transmitted over a secure connection, comprising:
    establishing a secure session with a second device;
    generating a command context structure for the secure session, wherein the command context structure includes key information for the secure session;
    storing the command context structure in a memory of the first device;
    processing, at the first device, a plurality of data packets associated with the secure session;
    receiving, in the cryptographic processor of the first device, a different initialization vector for each of the plurality of data packets;
    receiving, in the cryptographic processor of the first device, the key information from the stored command context structure, wherein the command context structure remains constant for each of the plurality of data packets; and
    performing cryptographic operations on the plurality of data packets.

2. The method of claim 1, wherein storing the command context structure includes:
    storing the command context structure in a cache.

3. The method of claim 2, further comprising, prior to receiving the key information:
    extracting the key information from the cache.

4. The method of claim 1, further comprising, prior to receiving the different initialization vector for each of the plurality of data packets:
    generating each initialization vector.

5. The method of claim 1, further comprising, prior to processing the plurality of data packets associated with the secure session:
    receiving the plurality of data packets from the second device over a network.

6. The method of claim 5, further comprising, prior to receiving the different initialization vector for each of the plurality of data packets:
    extracting an initialization vector from each of the received data packets.

7. The method of claim 5, further comprising:
    identifying the command context structure using information in the received plurality of data packets.

8. The method of claim 7, wherein identifying the command context structure includes:
    identifying the command context structure using source address and destination address information from a received data packet.

9. The method of claim 1, wherein performing cryptographic operations comprises:
    performing encryption operations on the data packets.

10. The method of claim 5, wherein the plurality of data packets are encrypted.

11. The method of claim 10, wherein performing cryptographic operations comprises:
    performing decryption operations on the data packets.

12. A system for performing cryptographic operations on a plurality of data packets transmitted over a secure connection, comprising:
    a memory storing a command context structure for a secure session,
    wherein the command context structure includes key information for the secure session;
    a processor configured to process the plurality of data packets associated with the secure session; and
    a cryptographic processor coupled to the processor, wherein the cryptographic processor is configured to:
        receive a different initialization vector for each of the plurality of data packets, and
        receive the key information from the stored command context structure, wherein the command context structure remains constant for each of the plurality of data packets in the secure session, and
        perform cryptographic operations on the plurality of data packets.

13. The system of claim 12, wherein the processor is further configured to:
    generate an initialization vector for each of the data packets in the plurality of data packets.

14. The system of claim 12, wherein the processor is further configured to:
    extract an initialization vector from each of the data packets in the plurality of data packets.

15. The system of claim 12, wherein the cryptographic processor is configured to encrypt the plurality of data packets.

16. The system of claim 12 wherein the processor is further configured to receive a plurality of data packets, wherein the plurality of data packets are encrypted.

17. The system of claim 16, wherein the cryptographic processor is configured to decrypt the plurality of data packets.

* * * * *